US006615222B2

(12) United States Patent
Hornibrook et al.

(10) Patent No.: US 6,615,222 B2
(45) Date of Patent: Sep. 2, 2003

(54) SYSTEM AND PROCESS FOR EVALUATING THE PERFORMANCE OF A DATABASE SYSTEM

(75) Inventors: John F. Hornibrook, Toronto (CA); John E. Lumby, Toronto (CA); Walid Rjaibi, Willowdale (CA); Calisto Paul Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/404,440

(22) Filed: Sep. 22, 1999

(65) Prior Publication Data

US 2003/0115212 A1 Jun. 19, 2003

(51) Int. Cl.[7] .............................................. G06F 17/00
(52) U.S. Cl. ................. 707/200; 707/3; 707/6
(58) Field of Search .......................... 707/1–206; 705/8

(56) References Cited

U.S. PATENT DOCUMENTS

| 5,671,403 A | | 9/1997 | Shekita et al. ................. 707/4 |
| 5,819,268 A | * | 10/1998 | Hackett .......................... 707/6 |
| 5,848,393 A | | 12/1998 | Goodridge et al. ............ 707/8 |
| 5,991,754 A | * | 11/1999 | Raitto et al. .................... 707/2 |
| 6,496,819 B1 | * | 12/2002 | Bello et al. ..................... 707/3 |

OTHER PUBLICATIONS

Legakis et al., Intelligent subject matter classification and retrieval, Electrical and Computer Engineering, 1993, Canadian Conference on, Sep. 14–17, 1993, pp. 15–18, vol. 1.*
Ehnes et al., The pen and paper paradigm—supporting multiple users on the Virtual Table, Virtual Reality, 2001, Proceedings, IEEE, 2001, pp. 157–164.*
Tsuhara, RDB structure chart display using fuzzy rules, Parallel and Distributed Systems, 1996, Proceedings, 1996 International Conference on, Jun. 3–6, 1996, pp. 510–515.*
www.storm.aoml.noaa.gov/Reports/Y1Report.*
www.google.com's cache of www.allenhayden.com/cgi-bin/getdoc.pl?file=ascr82.htm.*

* cited by examiner

*Primary Examiner*—David Jung (57) ABSTRACT

A system and process for evaluating the performance of an operational database system without interfering with the normal operation of the operational database system is described. The process involves the creation of a test database which contains the system catalogs of the operational database system as user tables. The test database is used to compile queries using these simulated system catalogs. The access plan generated by the compilation in the test database can then be used to evaluate the performance of the queries.

14 Claims, 7 Drawing Sheets

DB.TABLES

| SCHEMA_NAME | TABLE_NAME | FILE_ID | TABLE_ID | NROWS | NPAGES | ...... |
|---|---|---|---|---|---|---|
| C | EMPLOYEE | 107 | 12 | 27156 | 409 | ...... |
| C | DEPARTMENT | 210 | 47 | 27 | 11 | ...... |
| C | PROJECT | 173 | 33 | 63 | 28 | ...... |
| ...... | ...... | ...... | ...... | ...... | ...... | ...... |

16

DB.COLUMNS

| SCHEMA_NAME | TABLE_NAME | COL_NAME | COL_TYPE | COL_LENGTH | NDISTINCT_VALUES | ...... |
|---|---|---|---|---|---|---|
| C | EMPLOYEE | EMP_ID | INTEGER | 4 | 27156 | ...... |
| C | EMPLOYEE | EMP_NAME1 | CHARACTER | 30 | 14737 | ...... |
| C | EMPLOYEE | EMP_NAME2 | CHARACTER | 30 | 8007 | ...... |
| C | EMPLOYEE | EMP_DEPT | INTEGER | 4 | 27 | ...... |
| C | EMPLOYEE | EMP_PHONE | CHARACTER | 10 | 7893 | ...... |
| ...... | ...... | ...... | ...... | ...... | ...... | ...... |
| C | DEPARTMENT | DEPT_ID | INTEGER | 4 | 27 | ...... |
| C | DEPARTMENT | DEPT_NAME | CHARACTER | 30 | 26 | ...... |
| ...... | ...... | ...... | ...... | ...... | ...... | ...... |
| C | PROJECT | PROJ_ID | INTEGER | 4 | 63 | ...... |
| C | PROJECT | PROJ_NAME | CHARACTER | 100 | 63 | ...... |
| C | PROJECT | PROJ_START | DATE | 10 | 25 | ...... |
| ...... | ...... | ...... | ...... | ...... | ...... | ...... |

SYSTEM AND PROCESS FOR EVALUATING THE PERFORMANCE OF A DATABASE SYSTEM

BACKGROUND OF THE INVENTION

Purpose of the Invention

The invention provides a process for analyzing and predicting the performance of a Database Management System (DBMS) through the creation and use of a simulated test DBMS. The relatively small test database system reduces the cost of performing the analysis and minimizes the impact on the actual operating DBMS.

INTRODUCTION

Database systems often contain databases of immense size and complexity. Because of this size and complexity, obtaining the desired information in response to a query becomes a very complex process. This requires, for most queries, that the system must make many choices as to the manner in which to seek the data. In many cases, if the query is complex, it is often difficult to determine whether the database manager has selected the most optimum process for obtaining the required data.

Analyzing the performance of the system to a query could be done by running the query on the operational database system itself. It could also be done using a complete replica of the system. Modifications might also be made in the original database or replica to test and see if the query might be made to run faster. The first approach of using the operational system has an obvious negative impact on the system as it reduces system availability to other users, whereas, in the case of using a separate test system itself, it might be a very expensive proposition.

Another variation of the replica method that exists today is to avoid copying the data from the user tables that contain the data, but instead, creating empty tables and modifying the database catalogs to reflect information (statistics) that is needed by the compiler to match that of the original database. This could also require a large system and more time with the only advantage of reduced storage space as compared to the full replica.

The present invention overcomes this problem by using a test database on which the performance of the database system can be simulated without impacting the operational database system and without the need to create any of the user tables or modify associated information in the catalogs. The invention creates a copy of the database catalogs used in queries as data tables. The test database system can use these simulated catalogs to compile the query in a special simulation mode that does not need to reference the tables in the operational database system.

STATEMENT OF THE INVENTION

The invention provides a simulation tool for testing the performance of an operational DBMS where a separate test database is created having a copy of the system catalogs. The copy is stored as a set of user tables called simulation catalogs in the test database. Queries, compiled on the test database in a simulation mode, use the simulated catalogs instead of the normal system catalogs. With this process it is possible to recreate access plans which are equivalent to the access plans which would be generated by the operating DBMS in response to the same query. The invention enables analyzing the access plans without compiling on the operational DBMS and without the need to copy user data onto the test database system.

The present invention provides a system for analyzing the performance of an operational database management system comprising a test database management system including means for storing a copy of system catalog tables as simulated catalog tables in user tables in the test database, means for accepting test queries in the test system, means for compiling the test queries in the test system and means for generating an access plan in response to the test queries whereby analysis of the performance of the operational database management system can be performed.

The invention also describes a process for evaluating the performance of an operational database system which consists of the steps of creating a test database management system, storing a copy of system catalogue tables from said operational database management system in user tables in said test database, compiling queries on said test database and generating access plans for the queries, the access plans being used to evaluate the performance of the operational database management system.

OBJECTS OF THE INVENTION

A primary object of the invention is to analyze or predict the performance of an operational DBMS without impacting the operation of the DBMS.

A further object of the invention is to create a copy of catalog tables in an operational DBMS as user tables in a test DBMS to enable query processing in said test DBMS without accessing the operational DBMS during the query processing.

A further object of the invention is to compile test queries for an operational DBMS on a test database and generate access plans for the test queries without accessing the operational DBMS during the compilation.

DETAILED DESCRIPTION OF THE DRAWINGS

Figure 1:
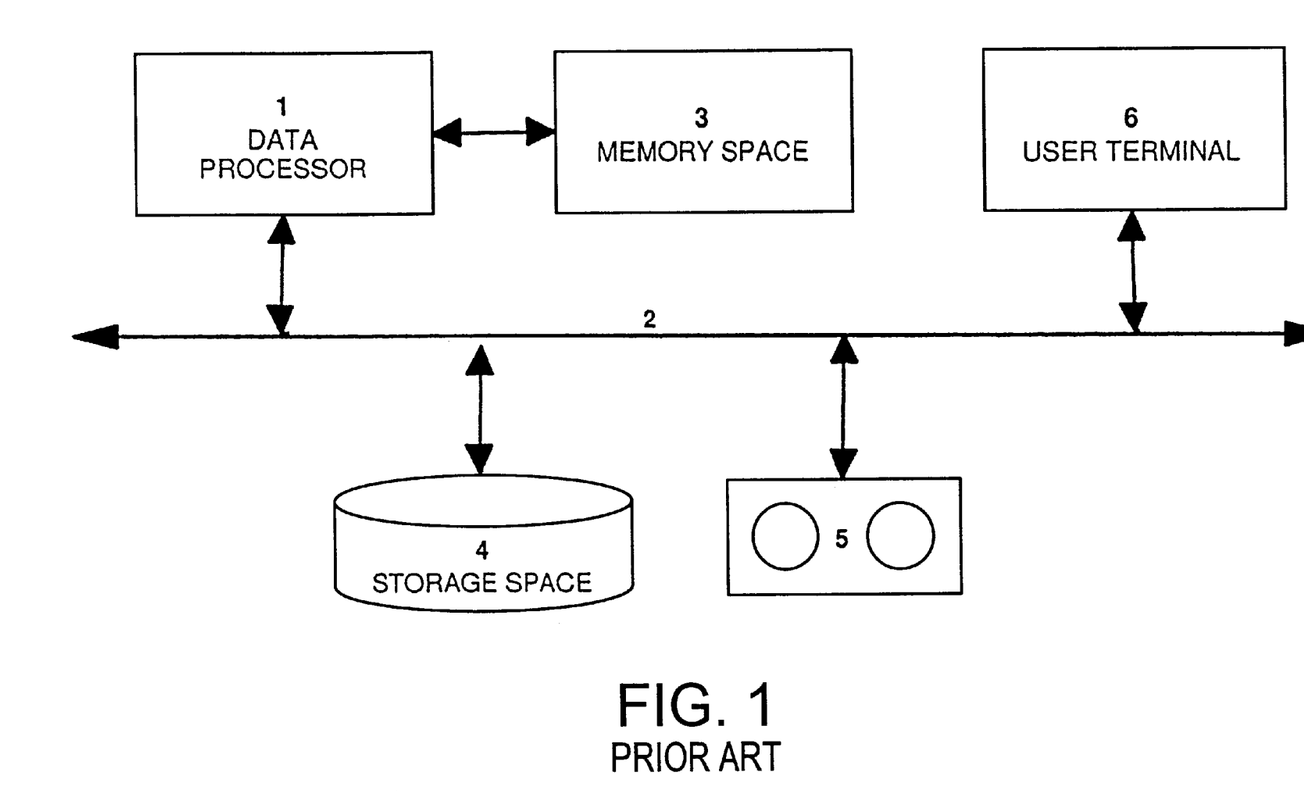
FIG. 1 is an example of a Prior Art Data Processing System for implementing a database system.

FIG. 1 provides a functional diagram exemplifying a data processing system for implementing a database system with which the present invention may be useful. The data processor[1] is coupled to a primary bus[2] and a memory space[3]. Bus[2] is coupled to a direct access storage device external store[4] and possibly a magnetic tape external store[5]. User terminal[6] coupled to bus[2] enables query inputs to the data processing system that responds with appropriate data from a database stored on the storage device. The software that runs on these database processor systems allow users to add, modify, delete or retrieve data from the database and is known as a database management system.

Figure 2:
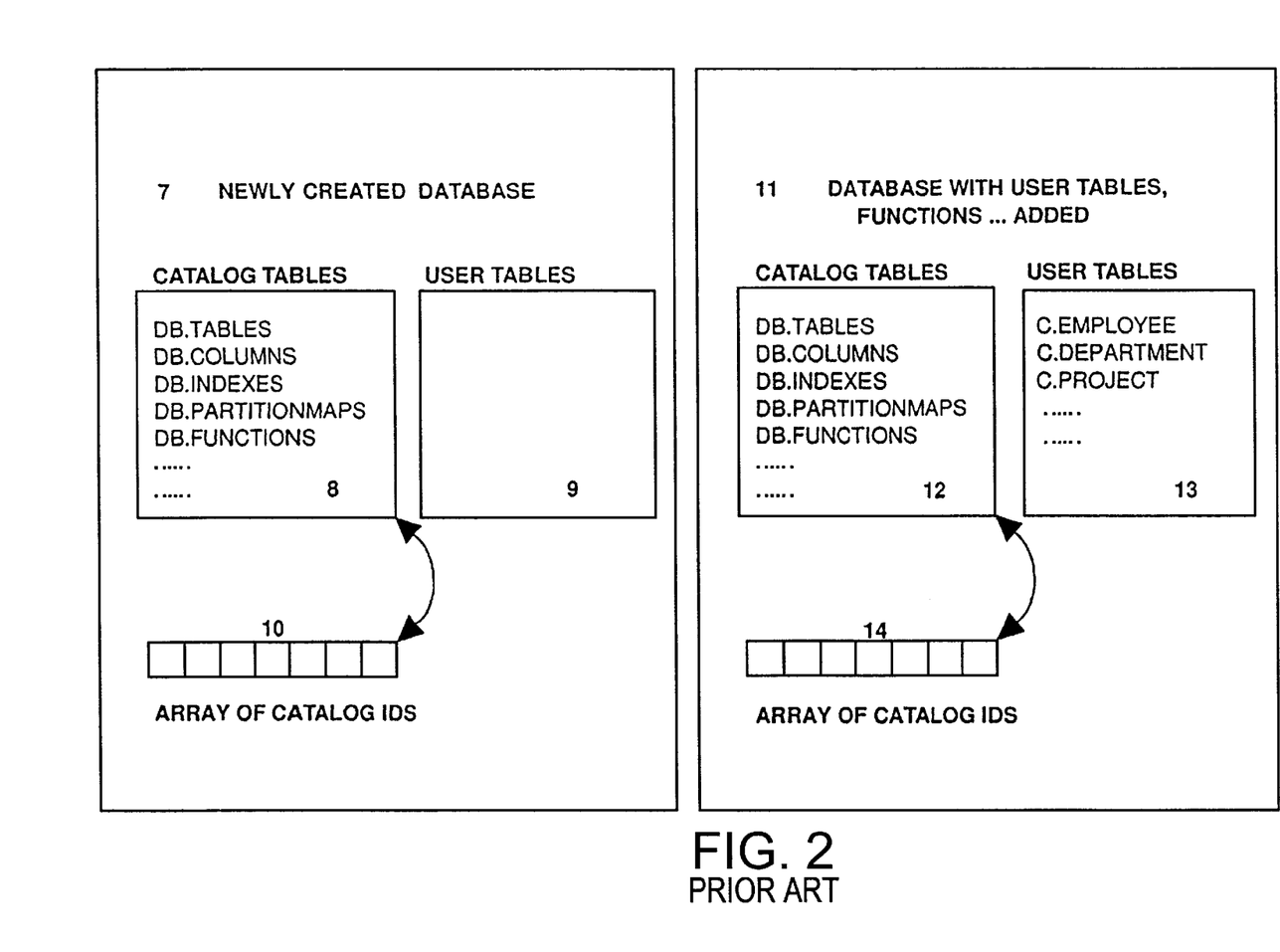
FIG. 2 is an example of a typical prior art database.

FIG. 2 shows a well-know database model. Data is stored in tables whose columns are predefined when the table is created. Each row contains values for each column and makes up an entry in the table. A database of this nature is called a Relational Database. To begin with, a relational database[7] can be created with a user command to the database management system. This activity automatically creates a set of tables that are called system catalogs tables[8]. At this point in time, there are no user tables[9] in the database. The system catalog tables[8] will contain the information necessary for the database management system to access data that the user might store in the database. In order to store data in the database the user creates user tables[13] as shown in database[11]. The definition of a user table[13] and information required to access the data in these user tables[13] is stored within the system catalog tables[12]. The user can change data directly only in the user tables[13] using an appropriate language interface to the database management system. The catalog tables[12] are maintained by the database management system. When a user creates a table[13] in the database, for example, some catalog tables[12] are automatically updated to store the definition of this new table[13]. Some systems allow some information to be directly modified by the user. This is usually information that is not critical to maintain the consistency of the database. Statistics about the data is one such piece of information.

Typically each system catalog table[12] has an ID that lets the database know where the catalog table[12] is stored on the storage device[4]. For convenience, an array of catalog IDs[14] is used to store the set for all the catalog tables.

Figure 3:
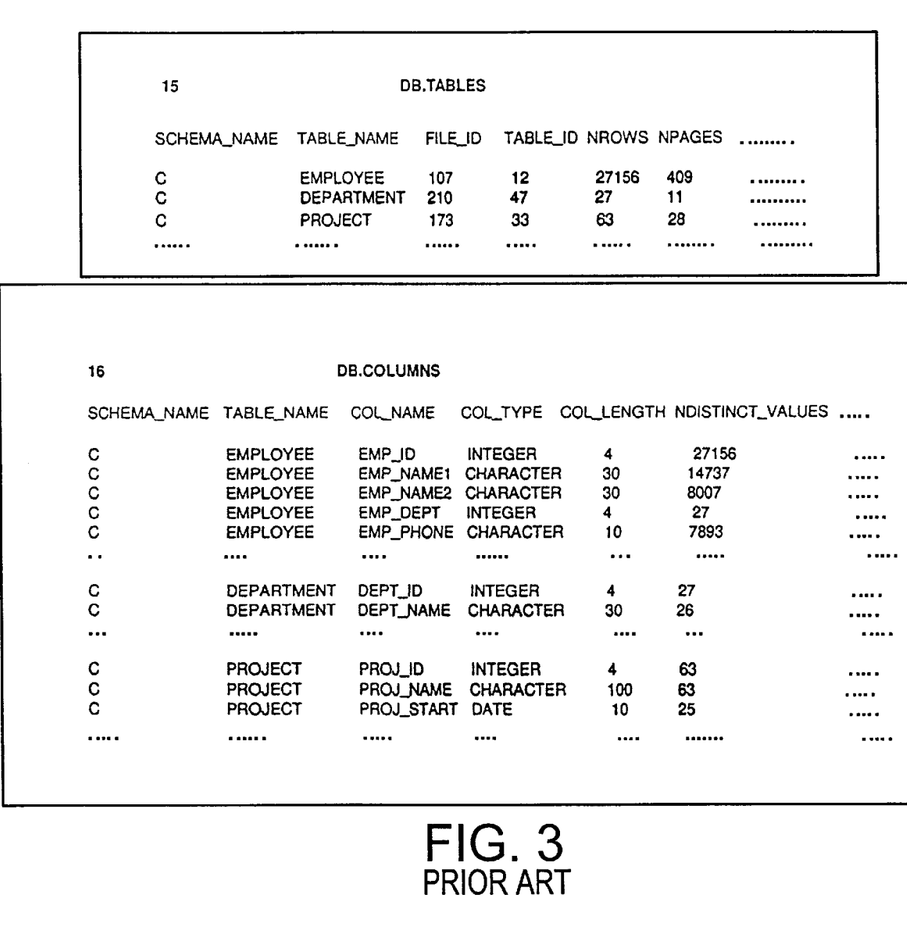
FIG. 3 illustrates an example of Catalog Tables stored in a typical database system.

In FIG. 3, we show an example of two catalog tables. The tables catalog[15] contains information about all of the tables in the database. It has, for example, the names of the tables, the IDs that are used to locate the data on the storage device and statistics that give some information on the size of the user tables. The columns catalog[16] has information pertaining to each column of all the tables[15]. It contains, for example, the column name, the column type and length and statistics that might help the database manager to understand the nature of the values in the columns. For the purpose of the present invention, we do not need to elaborate further on the contents of the catalogs[15] and [16].

Figure 4:
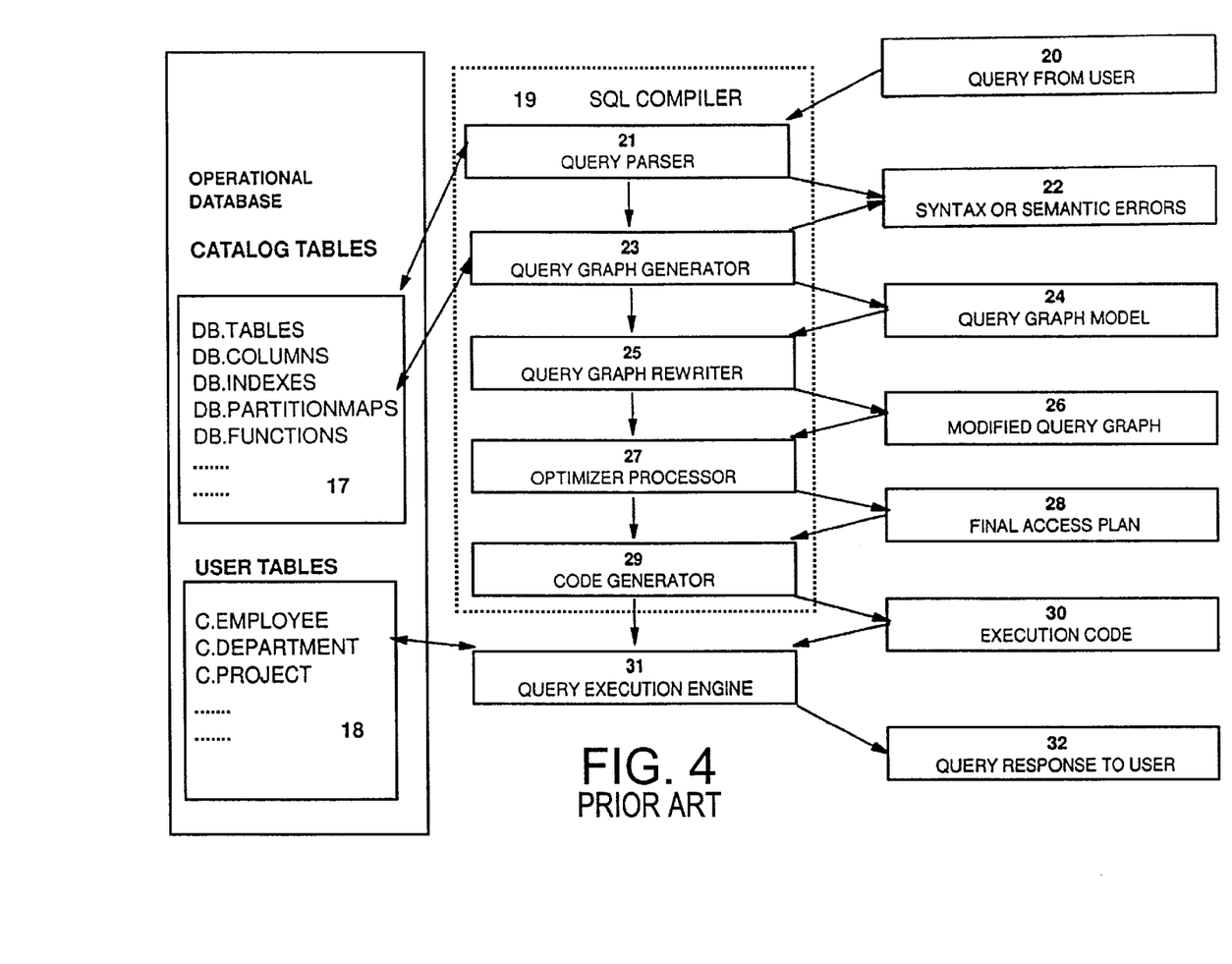
FIG. 4 illustrates a typical query processing example in a database system.

In FIG. 4, the database management system is shown in greater detail. The user's database query, input at user terminal[6] (See FIG. 1), is provided in a language that the database manager can understand. The Structured Query Language (SQL) is commonly used in relational database management systems. In our example, the SQL Compiler[19] and the execution engine[31] together make up the database management system. The database that is stored on a storage device is made up of system catalog tables[17] and user tables[18].

The user's query[20] is input to the database management system. It is parsed by a query parser[21] for any syntax errors. If the syntax is invalid, an error is issued to the user[22]. If the syntax is acceptable, the parser and the next phase, the query graph generator[23] look for semantic errors. To do this, the parser and query graph generator phases use information from the system catalogs[17]. These phases of the SQL Compiler need the information concerning the various user tables referenced in the user query. If there are no errors, a query graph model[24] is constructed in memory space[3] (See FIG. 1). This query graph can be enhanced through a rewrite phase[25] that provides a revised query graph[26]. This is often done to help the database manager rephrase the query in a better way for the optimizer phase[27]. The optimizer processor[17] takes this revised graph and looks at various options on how to access the data. It attempts to choose the most optimal plan to access the data. Among other things, it uses statistics on the data that were stored in the system catalogs[17]. The final access plan[28] is stored in memory space[3]. The code generator phase[29] translates the access plan into execution code[30]. The execution engine[31] uses this code to access the data and return the result of the query to the user[32]. As mentioned earlier, the set of phases including the SQL parser[21], the query graph generator[23], the query graph rewriter[25], the optimizer[27] and the code generator[29] is usually referred to as the SQL Compiler[19].

Often the user's database is critical to the operation of the organization. Applications that make use of the data need to be able to access the data in a fast and efficient manner. Much of the analysis regarding implementation and performance of the applications would have been done during development of the applications. However, changes to the database and the applications themselves require re-evaluation of the performance of the system. It may be difficult to do this analysis during regular usage of the database. The user may need to provide information to an analyst who may not have the authority to access the operational database. If the data is very voluminous or is highly confidential, the user may not want to send the data to the analyst. Even if they could send the data, the analyst may not have a similar computer system capacity as the user has. This invention allows analysis to be performed on a test database in a convenient manner without the need for a similar computer system capacity.

As shown in FIG. 4, all information necessary for the compiler to generate an access plan for the given user query is available in the system catalogs tables[17]. The actual user data is required by the database manager only in the execution engine phase[31]. Most often, this data is not required to analyze the performance of the database system or to do a what-if kind of analysis. For example, by looking at the final access plan through appropriate tools that capture it from the memory space, an analyst might be able to find out why a particular access plan would not perform well. The analyst could then suggest ways to improve the performance of accessing the data. This invention is based on the assumption that given the information in the system catalogs[17], the information provided by the SQL compiler helps an analyst to study the behaviour of an application as far as accessing the data within the database is concerned.

Figure 5:
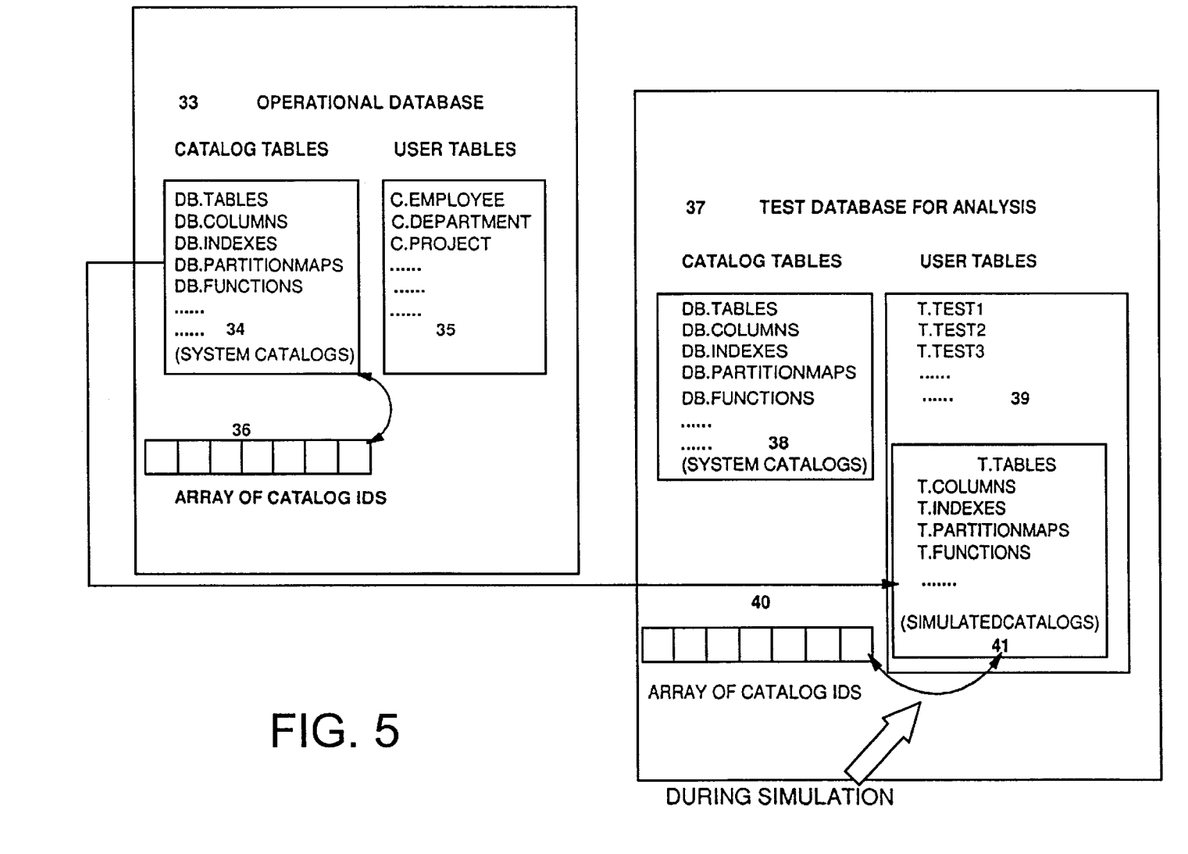
FIG. 5 illustrates the importation of catalogs into users tables in a test database in accordance with the present invention.
Figure 6:
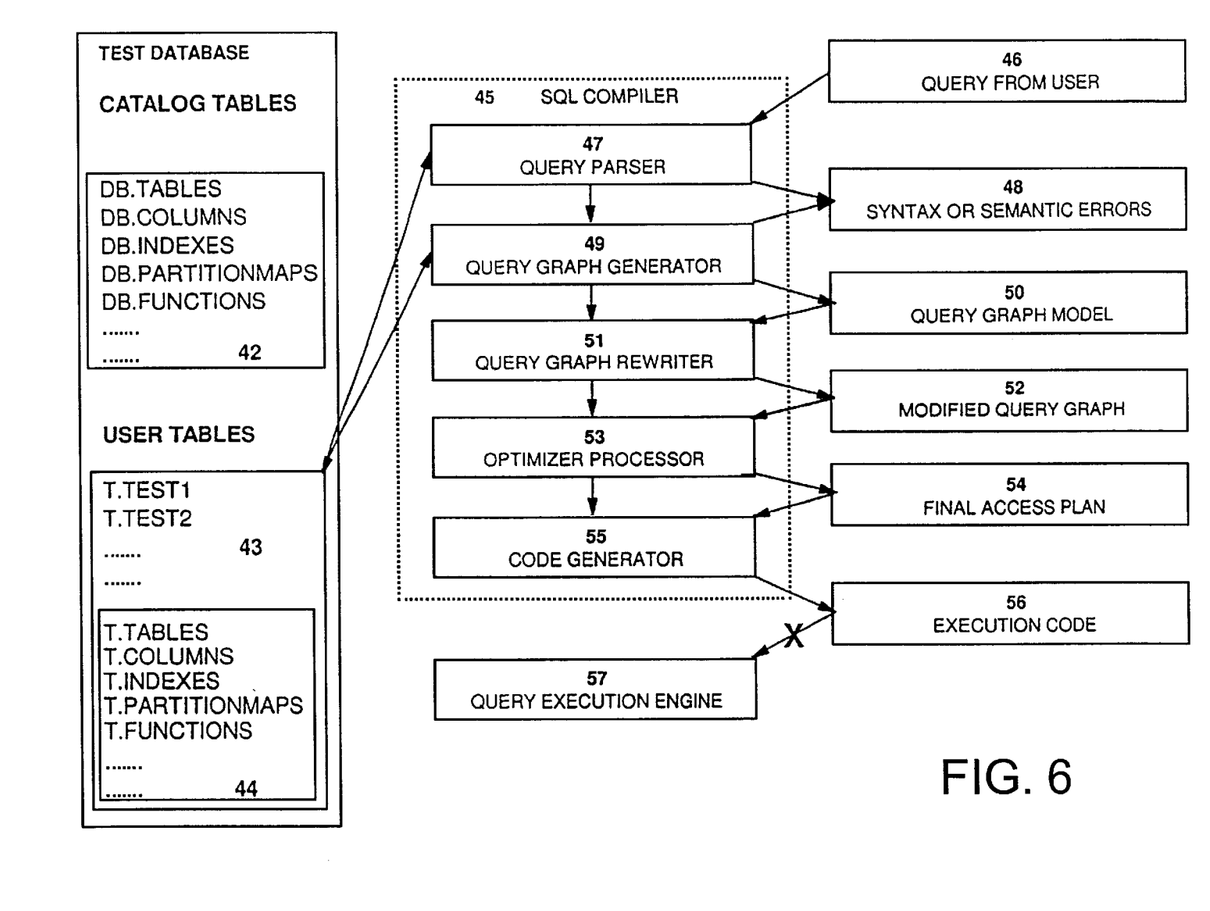
FIG. 6 illustrates the simulation of a query in the test database in accordance with the present invention.

FIG. 5 and FIG. 6 illustrate the system catalog simulation tool of the present invention. The motivation is to be able to analyze the data access plan in a test environment that is similar to that in the operational database system possibly using additional problem solving tools. The aim is to obtain a similar access plan or execution code that the user would obtain on the operational database[33]. Accordingly, a copy of the system catalog tables[34] used in query compilation is required by the simulation tool to generate the required information. For the purpose of this invention, it is assumed that any other database manager or database configuration information necessary for the SQL compiler is also available in the catalog tables[34]. An example of this information might be the speed that the computer executes the instructions to access the data or the speed of the transfer of data from the storage device or the amount of memory available to the database manager. If this information is not stored in the catalog tables[34], a separate step may be necessary to obtain this information. In a typical database management system, a convenient interface allows one to retrieve and update such configuration parameters.

FIG. 5 shows the step necessary before simulation of the compilation phase of the user's query. The set of catalog tables[34] necessary for compilation are imported into the analysts test database system[37] as regular user tables[41] in the user table[39] part of the database[37]. Relational databases usually have convenient mechanisms to copy this data. This set of tables will be referred to as a simulation catalog[41]. While the table names in catalog[41] may be the same as those in catalog tables[38], the schema name or qualifier of the simulated catalog tables[41] are different and this helps distinguish the two sets. The system catalog tables[38] and simulated catalog tables[41] contain the same information that is in the system catalogs[34] of the operational database. Given the user query (and any changes to the database manager and database configuration parameters that may be necessary), the analyst can start the simulation tool on the test database.

Normally, the SQL compiler fetches information from the system catalogs[38]. During the simulation catalog phase, the array of catalog IDs[40] are switched to point to the set of simulated catalogs[41] instead of the system catalogs[38]. The compilation will be performed as if it were done on the operational database and thus one can obtain the same query access plan or execution code on the test database as the user obtained on the operational database. This is done conveniently on the analyst's test database in a suitable problem solving environment with tools that may not be available in the operational environment of the actual DBMS.

In summary, the steps required to use the simulation catalog tool include:

1. Copying the system catalog tables[34] from the operational database[33] to the test database[37] as user[41] tables. These are the simulated catalogs.
2. Change any database manager or database configuration to enable compilation of queries of the test database system[37].
3. Enable the test systems catalog simulation tool through a command provided as part of the database manager to switch the array of catalog IDs[40] to point to the simulated catalogs[41].
4. Run queries through an SQL Compiler in the test database[37] in order to simulate the performance of the actual operational database[33] and perform an analysis of its performance.
5. In order to return the test database system to its normal operation, the test systems catalog simulation tool is disabled through a command provided to switch the catalog IDs to point back to the test system's catalog tables[38].

FIG. 6 shows a query[46] being processed by the SQL compiler[45] on the test system during simulation. Note that the query parser[47] and the query graph generator[49] use the simulated catalogs[44] instead of the test database's system catalogs[42]. Also note that the execution code[56] generated by the code generator[55] is not sent to the execution engine[57]. This query execution engine[57] would not work as the user tables referenced by the user's query are not present in the test database. However, the processing of the query[46] through the SQL compiler[45] on the analyst's test database is very similar to the processing which would take place in the user's database. Analysis can be done on any aspect, relevant to the SQL Compiler, that does not require any more information about the actual data in the user's database other than what is in the simulated catalogs[44].

The catalog simulation tool can also be exploited to do what-if experiments. The SQL compiler[45] bases its decision to choose a particular access plan for a given query on the information it fetches from the system catalog tables[44]. Thus, it is possible to try what-if experiments by changing some of the information in the system catalog tables[44] and looking at how the SQL compiler[46] adjusts the access plan it generates based on these changes. For example, one might want to see how much time it would take to access the data given that in future the data in the database will double. By changing the statistics of the data in the simulated catalogs[44], details in the query access plan might indicate how much time accessing the data is likely to take.

Another example of a what-if scenario is one that adds an index for a given table to see if a better plan can be obtained. In databases, indexes are auxiliary structures that help access the data within the tables. Without the simulation catalog tool the index would have to be created on disk which could take time and space if done on the real database. This is necessary because the system catalog tables are consistent with the data within the database. The simulation catalog tool enables adding an index by simply inserting a row in the simulated catalog table. The simulated catalogs are not linked to the real data as the system catalogs in the operational database are. In such a what-if experiment, no index is actually created on disk. In the simulation mode, the access plan could be analyzed to see how beneficial such an index might be for a given query.

In one embodiment of this invention, a separate copy of the SQL compiler's array of catalog IDs may be created rather than just overwriting the original array. This is useful if other users are using the database. Other users will use the system catalogs based on the original array of catalog IDs. This allows the simulation mode in an active operational system itself where one might want to do the what-if scenarios or analyze application queries and access of the data. Here the system catalogs are copied as simulated catalogs within the database itself. When one user is in simulation mode, other users of the database will not be affected in the same way as they would if the actual system catalogs were used to do the analysis. Multiple users could do analysis using simulated catalogs at the same time.

Figure 7:
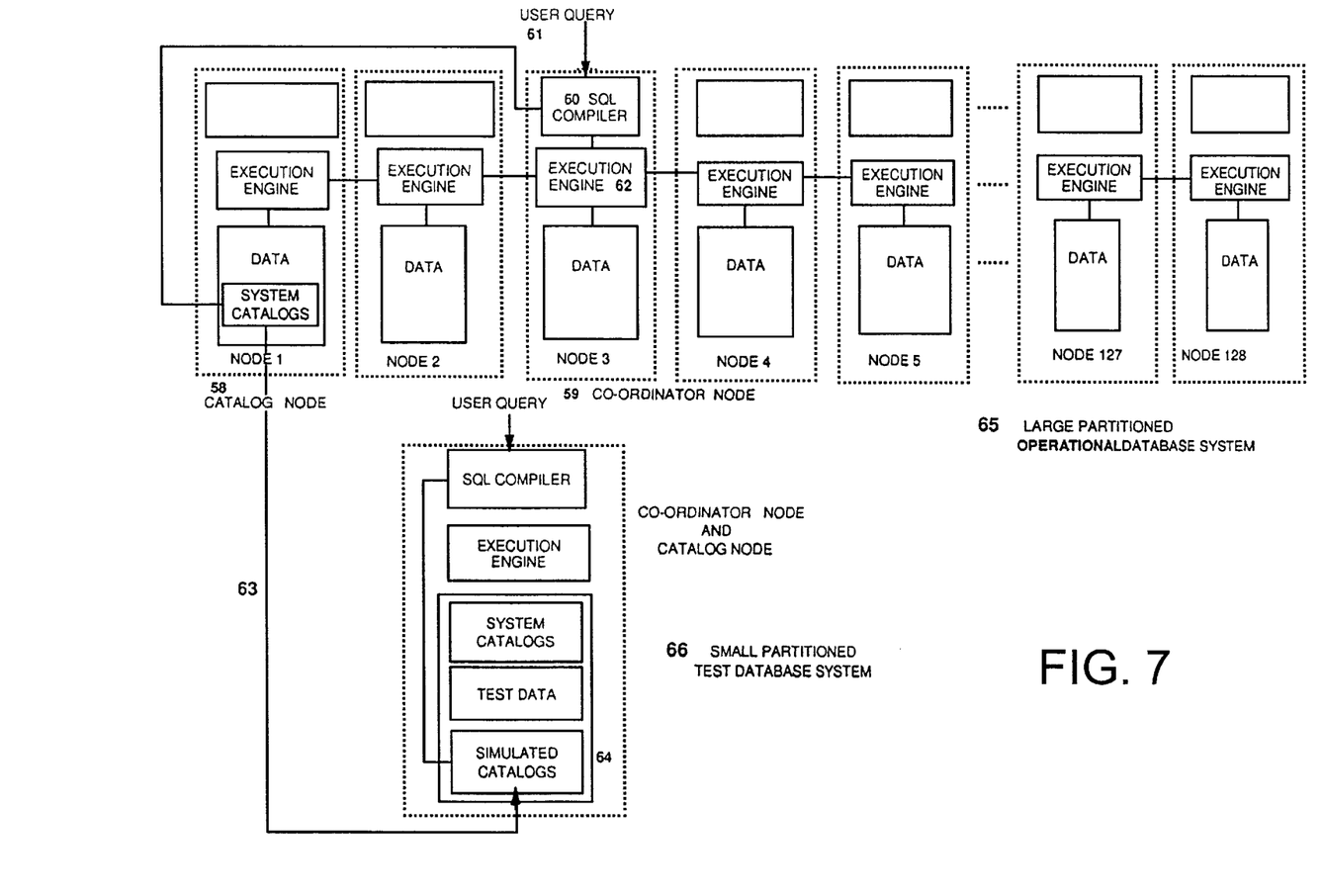
FIG. 7 illustrates the relationship between a large complex database system and the simulation of that system on a small test database system in accordance with the present invention.

So far, in the description of this invention, a simple database processor system as in FIG. 1 has been described. Large database processor systems can be very complex. In some systems, like the DB2 database management system from IBM, several computers or database processor systems can be connected together. A single database can be partitioned across all these processor systems referred to as nodes. With commands or queries from the user, the database management system manages updates or retrieves data from this partitioned database by communicating with parts of the software active on all the nodes. FIG. 7 shows such a system[65]. The system catalogs are stored on one of the nodes. This is referred to as the catalog node[58]. A user can connect to any one of these nodes to pass the query to the database management system. This node is referred to as the coordinator node[59]. The catalog node[58] and the coordinator node[59] could be the same. In terms of the processing steps, the SQL compiler[60] processes the query[61] on the coordinator node[59] in a similar manner as that in a single node database system. One difference is that the catalog information is retrieved from the catalog node[58] which may be on another node. All information on how the data is partitioned across the nodes is contained in the system catalogs. The SQL compiler evaluates and chooses the optimal plan in terms of how best to access the data from each partition. This is based on how the tables are partitioned and laid out on the various nodes and how the data is referenced within the user's query. After compilation, the access plan execution code is passed to the execution engine[62] on the coordinator node[59]. From here portions of the execution code are passed appropriately to the execution engines on all nodes that are involved in accessing data to satisfy the query. The response is passed back to the user through the coordinator node.

The need to analyze queries is even greater in such large systems.

A previous method of simulating such a large partitioned operational database was to create empty tables similar to the user's tables on a test database. The test computer environment had to be similar to that of the operational site in terms of the number of nodes and partitions of the database. This necessitated a large multi-node computer system to mimic that of the operational system. Even though the tables are empty, the statistics of the tables in the test database had to be updated to match the actual user tables statistics as these are necessary to get the same access plan. This is usually time consuming and often not feasible with the requirement of many nodes, even though the tables are empty. The process can be error prone with very complex queries involving many tables and associated entities whose definitions and related information need to be transferred to the test database.

This invention relies on the user's database catalogs to provide all the necessary information to the SQL compiler about the data in the tables, the related entities and the way the data is partitioned in the multi-node system. There is no need to create tables like those in the operational database since the simulation stops at the end of the compilation phase. In FIG. 7, we show a test database processor system[66] that has system catalogs and test data unrelated to that of the operational system. In order to use the catalog simulation method of this invention, as with the single node scenario described earlier, the system catalogs from the operational database are imported as user tables into the test database system[66]. A simulation command switches the array of catalog IDs to point to the simulated catalogs[64]. The user query is then sent to the test database management system in order to do whatever was intended with the simulation. One can easily simulate the compiler phase of very large multi-partitioned database processor systems with a small test database processor system as there is no need to have the same number of data nodes as the production database. By using the simulated catalogs[64] the SQL Compiler thinks it is using the large operational computer system.

The embodiments of the invention in which an exclusive property or privilege is claimed are defined as follows:

1. A system for enabling analysis of the performance of an operational database management system using a test database management system, said test database management system including:
   means for storing a copy of system catalog tables from said operational database management system in user tables in said test database management system, without storing user tables from said operational database management system;
   means for accepting test queries in said test database management system;
   means for compiling said test queries in said test database management system, said means for compiling being substantially identical to means for compiling queries in said operational database management system; and
   means for generating an access plan for each test query whereby the ability of said operational database management system may be evaluated.

2. A system as defined in claim 1 wherein said queries are written in the Structured Query Language (SQL).

3. A system as defined in claim 1 wherein said means for compiling is an SQL compiler.

4. A system as defined in claim 3 wherein said means for compiling includes a query parser, a query graph generator, a query graph rewriter and an optimized processor.

5. A system as defined in claim 4 wherein said catalog tables further include any other catalog table storing information pertaining to information required by said SQL compiler.

6. A system as defined in claim 1 wherein said copy of the catalog tables include at least tables identifying all the system tables in the operational database management system.

7. A system as defined in claim 1 wherein said operational database system is distributed over a plurality of nodes and said test database system consists of a single node.

8. A system as defined in claim 1 wherein one or more identifiers of the system catalog tables stored in the operational database management system differ from one or more identifiers of the corresponding system catalog tables stored in the test database management system.

9. A method for enabling analysis of the performance of an operational database management system, said method comprising the following steps:
   creating a test database management system;
   storing a copy of system catalog tables stored in said operational database management system in said test database management system, said catalog tables being stored as simulated system catalogs in user data tables in said test database management system, without storing user tables from said operational database management system;
   compiling a query on said test database management system using said simulated system catalogs; and
   generating an access plan for said query whereby the access plan can be analyzed.

10. A method for evaluating performance of an operational database system comprising the steps of:
    creating a test database system having the compilation characteristics of said operational database system including user tables, catalog tables, a computer, and a catalog ID table;
    storing a copy of system catalog tables stored in said operational database as simulated system catalog tables in user tables in said test database system, without storing user tables from said operational database management system;
    compiling a query on said test database, said query addressing said simulated system catalog tables through said catalog ID table; and
    generating an access plan for said query whereby said performance can be evaluated by analyzing said access plan generated by said test database.

11. A method for enabling the studying of the various phases of a compiler during development of an SQL compiler of a database management system based on information used by the compiler within an operational database system, said method including creating a replica of said operational database system on a test database system, said replica excluding the user tables from said operational database system, and running said test database system so as to simulate compilation of said operational database system.

12. A computer program product tangibly embodying a program of instructions executable by a computer to perform a method for enabling analysis of the performance of an operational database management system, said method comprising the following steps:

creating a test database management system;

storing a copy of system catalog tables stored in said operational database management system in said test database management system, said catalog tables being stored as simulated system catalogs in user data tables in said test database management system, without storing user tables from said operational database management system;

compiling a query on said test database management system using said simulated system catalogs; and generating an access plan for said query whereby the access plan can be analyzed.

13. A computer program product tangibly embodying a program of instructions executable by a computer to perform a method for evaluating performance of an operational database system comprising the steps of:

creating a test database system having the compilation characteristics of said operational database system including user tables, catalog tables, a computer, and a catalog ID table;

storing a copy of system catalog tables stored in said operational database as simulated system catalog tables in user tables in said test database system, without storing user tables from said operational database management system;

compiling a query on said test database, said query addressing said simulated system catalog tables through said catalog ID table; and generating an access plan for said query whereby said performance can be evaluated by analyzing said access plan generated by said test database.

14. A computer program product tangibly embodying a program of instructions executable by a computer to perform a method for enabling the studying of the various phases of a compiler during development of an SQL compiler of a database management system based on information used by the compiler within an operational database system, said process including creating a replica of said operational database system on a test database system, said replica excluding the user tables from said operational database system, and running said test database system so as to simulate compilation of said operational database system.

* * * * *